United States Patent [19]

de Vries

[11] 4,127,288
[45] Nov. 28, 1978

[54] MOVABLE CONNECTION FOR LINE SECTIONS

[75] Inventor: Huibert de Vries, Alblasserdam, Netherlands

[73] Assignee: Bos Kalis Westminster Group N.V., Sliedrecht, Netherlands

[21] Appl. No.: 793,431

[22] Filed: May 3, 1977

[30] Foreign Application Priority Data

May 5, 1976 [NL] Netherlands ................ 7604796

[51] Int. Cl.$^2$ ............................................. F16L 39/00
[52] U.S. Cl. ................................. 285/136; 285/137 R; 37/72
[58] Field of Search ............... 285/283, 137 R, 137 A, 285/184, 203, 168, 164; 37/72; 141/279, 387; 137/580, 615

[56] References Cited

U.S. PATENT DOCUMENTS

| 3,286,286 | 11/1966 | Nelson | 37/72 X |
| 3,302,315 | 2/1967 | Himes | 285/168 X |
| 3,985,167 | 10/1976 | Roque | 285/137 R |

FOREIGN PATENT DOCUMENTS 657,289  9/1951  United Kingdom ................ 37/72

Primary Examiner—Werner H. Schroeder
Assistant Examiner—Carl J. Arbes
Attorney, Agent, or Firm—Cushman, Darby & Cushman

[57] ABSTRACT

Movable connection between each time two parts of at least one line and a support construction substantially parallel therewith and connected thereto to enable a pivoting movement substantially about a longitudinal axis parallel to the longitudinal axes of the interconnected parts, whereby between each time the two parts there is disposed a known per se revolving piece, enabling a pivotal movement about the through-longitudinal axis of the part connected by the revolving piece, at least two revolving pieces being mounted on a common longitudinal axis and in longitudinal direction in spaced apart and tandem relationship.

8 Claims, 2 Drawing Figures

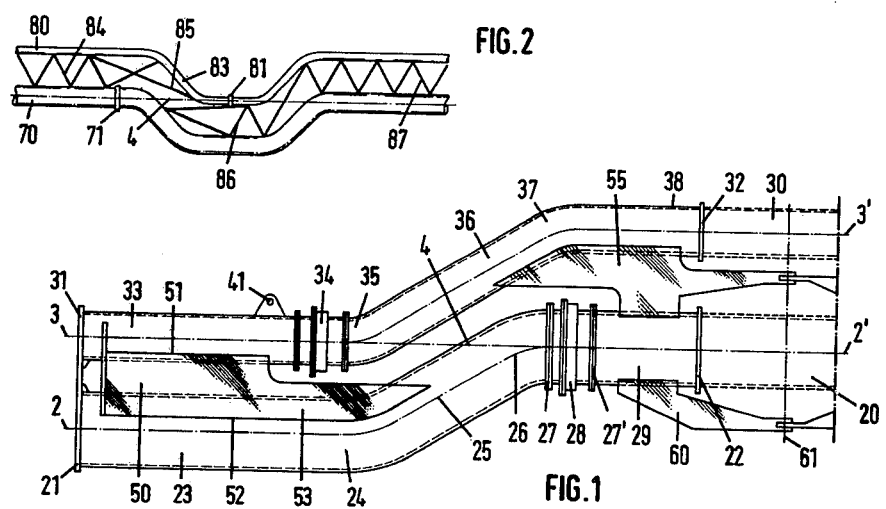

MOVABLE CONNECTION FOR LINE SECTIONS

The present invention relates to a movable connection between two sections of at least one line and a substantially parallel support construction connected therewith in order to enable a pivotal movement substantially about a longitudinal axis parallel to the longitudinal axes of the connected sections.

For a single pipeline as used for instance as suction pipe or delivery pipe for dredging equipment, use is made sometimes of so-called revolving pieces or gland connections, enabling a rotation of the co-extensive pipe sections about their common longitudinal axis. Furthermore it is known to use, in order to enable a movement about another axis, cardanic pivots or one or more hinge joints in tandem relationship, while use is also made of ball joints. However when the line sections are fixedly connected to parts of a support construction, the common movement of the interconnected parts constitutes problems. When thereby a connection is disposed between the parts of the support construction by means of which a relative movement about their longitudinal axis is possible, special provisions have to be made for the movable connection between the sections of the line. For comparatively light lines it is conventional to employ a flexible connection, e.g. a hose coupling. Such a solution is only possible insofar the prevailing pressures are not too high and the dimensions of the pertinent line are restricted. These problems are the more relevant when the support construction itself is formed by one or more separate lines by means of which the former line is fixedly connected. Two or more parallel, interconnected lines for instance are employed in dredging vessels. For instance in a trailing suction dredger, wherein a suction head is connected to a suction tube, delivery water can be conducted to the draghead via a separate delivery water line parallel to the suction tube. Also, interconnected lines are employed when a dredging mixture is pumped through a pressure pipe and the transport water has to be returned or when separate water of a special composition has to be supplied, for instance fresh water, when said water has to be used for de-salting purposes.

In addition to the application of hose sections in one or more of the pipes positioned adjacent the main line, it has also been proposed to mount a revolving piece in the main line which is provided with two concentric passages, it being possible to use parallel lines on either side of the revolving piece. Such a revolving piece is complicated and expensive and requires considerable maintenance.

It is the object of the present invention to provide an improved movable connection of the above-indicated type.

To this effect it is proposed to each time mount between the two portions a known per se revolving piece, enabling a pivotal movement about the continuous longitudinal axis of the portions connected by the revolving piece, while mounting said revolving pieces on a common longitudinal axis and in longitudinal direction in spaced apart and tandem relationship. By such an embodiment the interconnected portions in proximity to the connection will be offset some distance transversely to the common longitudinal axis. The portions beyond the revolving pieces may be rigidly connected to an adjoining portion. In this embodiment a pivotal movement exceeding 180° is possible in general, which in practice offers sufficient adjustment possibilities. The position of the swivel axle may be determined in dependence on further requirements to be set, for instance in the extension of a first, straight, fixed portion of a main line. In this case the support construction part beyond the revolving piece or one of the other line sections may extend in the extension of the common axis of the two revolving pieces and of the first portion of the main line. However the swivel axle may also be mounted in a different suitable location and be oriented differently relative to the axes of the other portions, insofar only the longitudinal axes of the revolving pieces are co-extensive. Preferably the swivel axle is so positioned that it optimally coincides with the direction and the location wherealong any tensile forces present extend in the interconnected portions. Preferably a main line may run on either side of the connection in the extension of the longitudinal axis thereof.

For the connection of the substantially parallel extending portions use in effectively made of at least one connection support which is fixedly connected to the pipe section connected to one revolving piece, said connection support bulging to beyond the respective revolving piece, thereby supporting the adjacent construction portion or vice versa the construction portion carrying the pipe section.

Some embodiments of the invention will now be described, by way of example, with reference to the accompanying drawings wherein FIG. 1 shows a movable connection according to the invention for two parallel extending pipes; and FIG. 2 shows a preferred embodiment of a movable connection in a main line and an auxiliary line running parallel therewith.

The examples each time show two parallel extending pipes. However one of the lines may be replaced by or completed by a support construction or carrier construction, in which case the interconnected portions of the support construction and the line section or sections should be capable of performing a pivotal movement about a common pivoting shaft.

Said movable connection according to FIG. 1 comprises substantially two parallelly extending pipe sections whose axes are indicated by 2—2' and 3—3'. The one line section is provided at the left side with a flange 21. At the right-hand side there is disposed a flange 22. The other pipe section whose axis is indicated by 3, carries at the left-hand side a connection flange 31. At the right-hand side there is shown a connection flange 32. To said connection flanges can be mounted abutting pipe sections, as shown at the right-hand side by broken lines by 20 and 30 respectively. It will be clear that at the left-hand side of the connection flanges 21 and 31 corresponding pipe sections can be mounted, or be welded.

The pipe section whose axis is indicated by 2 comprises in the figure from the left to the right a straight pipe section 23, a bend 24, a straight pipe length 25 and again a bend 26. Said bend 26 terminates in a flange 27 whereon is mounted a normal revolving piece 28. Said revolving piece abuts with a flange 27' on a straight pipe length 29 provided with the end flange 22. Correspondingly the pipe section whose axis is indicated by 3, is composed of a straight pipe length 33, a revolving piece 34, a bend 35, a straight pipe length 36, a bend 37 and a straight pipe length 38 on which is mounted the flange 32. As shown, the extended axis 3 runs from the left-hand side of the Figure via the pivotal shaft or longitudinal axis of the revolving piece 34 straight on, indicated by 4, coincides with the longitudinal axis or pivotal shaft of the revolving piece 28 and extends in the extension of the right end of the axis 2'. Since the two revolving pieces are as a matter of fact of conventional construction, a further description thereof is unnecessary. At 41 there is indicated a suspension eye by means of which the connection construction and possibly the interconnected pipes can be suspended from sheers or winches.

At 50 is indicated a bracket between the two left portions of the line sections. Said bracket is fixedly connected at 51 to the upper pipe length 33 and at 52 to the lower pipe length 23. The bracket 50 is provided beyond the revolving piece 34 to a portion 53 bulging therebeyond which supports the bend 24 and the straight pipe length 25. Correspondingly there is mounted a bracket 55 at the right-hand side of the Figure, through which the bend 37 and the straight pipe length 36 are connected to the last straight section 29 of the lower pipe length.

Furthermore there is depicted a hinge construction 60 having a pivot axis 61. The line sections 20 and 30 respectively, are flexibly designed in situ or provided with a so-called pocket through which the two parallel pipes can pivot about pivot 61.

Depending on the practical requirements, a movable connection as described in the above, can be disposed in the most suitable place in a line system. For instance in a trailing suction dredger it is efficient to dispose said pin joint in the last pipe length before the trailing suction dredger mouth. In case of a non-horizontal sea bottom the suction mouth can be adjusted freely relative to the pipe. However it is recommendable for cutter dredgers or suction dredgers to mount the movable connection in the first pipe length connectibly to the dredging vessel.

In the embodiment shown in FIG. 2 a main line 70 and an auxiliary line 80 are illustrated. In the main line there is mounted a revolving piece 71 and in the auxiliary line a revolving piece 81. The left and right portion of the main line 70 extend co-extensively of the pivot axis 4, for which purpose there is mounted in the Figure at the right-hand side of the revolving piece 71 a faintly U-shaped bend in the main line. In the free space runs auxiliary line 80 provided with a likewise faintly U-shaped portion 83 wherein there is present a revolving piece 81. Between the two lines 70 and 80 there is always present a diagrammatically indicated construction 84, 85, 86 and 87. The support construction portions 84 and 87 are present at the left and at right of the portion where the movable connection is mounted. The support construction portion 85 connects the portion of the main line 70 on the left of revolving piece 71 to the bend 83 in the auxiliary line as far as the revolving piece 81. The support construction 86 extends from the auxiliary line 80 on the right of the revolving piece 81 to the left to beyond said revolving piece for supporting the U-shaped portion in the main line. It is observed that instead of two parallel pipe lines, also more than two lines are possible. It is often desirable, mainly for lines conducting dredging mixtures, to rinse the revolving pieces with water, for which purpose use is preferably made of a rinsing water line which is connected to one or more of the revolving pieces, use being preferably made for the supply of the rinsing water of a connection to one of the pipe lines.

I claim:

1. Apparatus comprising: at least one pipe line having two portions connected end-to-end by a first revolving piece which permits relative rotation of the two portions about a rotation axis which is the same as the longitudinal axis of at least one of the portions; and a pipe-line support structure extending substantially parallel to said pipe line portions and connected thereto, said support structure having two portions connected end-to-end by a second revolving piece which is longitudinally spaced from said first revolving piece, said second revolving piece permitting relative rotation of the two support structure portions about a common rotation axis that is the same as the rotation axis of the pipe line portions.

2. Apparatus as in claim 1 wherein one of said pipe line portions is straight and wherein said common rotation axis coincides with the axis of said straight portion.

3. Apparatus as in claim 2 wherein the other of said pipe line portions includes a straight section having an axis which coincides with said common rotation axis and an offset section adjacent said first revolving piece.

4. Apparatus as in claim 1 wherein said common rotation axis coincides with the axis of one of said pipe line portions and with the axis of one of said support structure portions.

5. Apparatus as in claim 1 including a bracket between at least one pipe line portion adjacent one of the revolving pieces and the adjacent parallel portion of said support structure, said bracket extending to beyond the respective revolving piece in the direction of the other revolving piece.

6. Apparatus as in claim 1 wherein said support structure includes at least one pipe line.

7. Apparatus as in claim 1 wherein at least one of the revolving pieces is provided with a rinse water connection which is connected to one of the pipe line portions.

8. Apparatus as in claim 1 wherein said pipe line includes a straight main line interrupted by an offset portion which is connected at its ends to said main line by bends and wherein the axis of said main line coincides with said common rotation axis.

* * * * *